US012760958B2

(12) United States Patent
Lee et al.

(10) Patent No.: US 12,760,958 B2
(45) Date of Patent: Oct. 13, 2026

(54) REFRIGERATOR WITH PASSAGE FOR A WATER PIPE AND ELECTRICAL WIRE BETWEEN CABINET AND DOOR

(71) Applicant: LG ELECTRONICS INC., Seoul (KR)

(72) Inventors: Sanggyun Lee, Seoul (KR); Younseok Lee, Seoul (KR); Yongwon Dong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 18/722,024

(22) PCT Filed: Dec. 9, 2022

(86) PCT No.: PCT/KR2022/020055

§ 371 (c)(1),
(2) Date: Jun. 20, 2024

(87) PCT Pub. No.: WO2023/121085

PCT Pub. Date: Jun. 29, 2023

(65) Prior Publication Data

US 2025/0067501 A1 Feb. 27, 2025

(30) Foreign Application Priority Data

Dec. 21, 2021 (KR) ........................ 10-2021-0183631

(51) Int. Cl.
*F25D 23/02* (2006.01)
*E05D 11/00* (2006.01)

(52) U.S. Cl.
CPC ........ *F25D 23/028* (2013.01); *E05D 11/0081* (2013.01); *E05Y 2900/31* (2013.01); *F25D 2323/024* (2013.01)

(58) Field of Classification Search
CPC ............. F25D 23/028; F25D 2323/024; E05D 11/0081; E05Y 2900/31
See application file for complete search history.

(56) References Cited

U.S. PATENT DOCUMENTS

2018/0202706 A1* 7/2018 Lee ....................... F25D 29/005
2021/0270517 A1 9/2021 Cho et al.

FOREIGN PATENT DOCUMENTS

KR 10-0596569 7/2006
KR 10-0743748 7/2007
(Continued)

OTHER PUBLICATIONS

Machine English language translation of KR2010054353 to Gwak et al. Translated Dec. 2025 (Year: 2010).*
(Continued)

*Primary Examiner* — Cassey D Bauer
(74) *Attorney, Agent, or Firm* — KED & ASSOCIATES

(57) ABSTRACT

A refrigerator including a cabinet including a storage space; a door configured to open or close the storage space and including an electric component; a hinge device configured to rotatably connect the door to the cabinet; a water pipe extending from the cabinet and connected to the door; and a wire configured to electrically connect a component in the door and the cabinet to each other. The door includes a door opening which is disposed at a position spaced apart from a center of rotation by the hinge device and through which the water pipe and the wire pass, and a guide disposed inside of the door and aligned with the door opening.

18 Claims, 9 Drawing Sheets

(56) References Cited

FOREIGN PATENT DOCUMENTS

| | | |
|---|---|---|
| KR | 10-2010-0054353 | 5/2010 |
| KR | 10-2018-0124454 | 11/2018 |
| KR | 10-2019-0134567 | 12/2019 |
| KR | 10-2283975 | 7/2021 |

OTHER PUBLICATIONS

Machine English translation of KR20180124454 to Kim et al. Translated Dec. 2025 (Year: 2018).*
European Search Report dated Feb. 25, 2025 issued in Application No. 22911718.9.
International Search Report dated Mar. 15, 2023 issued in Application No. PCT/KR2022/020055.

* cited by examiner

REFRIGERATOR WITH PASSAGE FOR A WATER PIPE AND ELECTRICAL WIRE BETWEEN CABINET AND DOOR

CROSS-REFERENCE TO RELATED PATENT APPLICATIONS

This application is a U.S. National Stage Application under 35 U.S.C. § 371 of PCT Application No. PCT/KR2022/020055, filed Dec. 9, 2022, which claims priority to Korean Patent Application No. 10-2021-0183631, filed Dec. 21, 2021, whose entire disclosures are hereby incorporated by reference.

TECHNICAL FIELD

The present specification relates to a refrigerator.

BACKGROUND ART

In general, a refrigerator is a home appliance for storing food at a low temperature in a storage space that is covered by a refrigerator door. The refrigerator is configured to keep stored food in an optimal state by cooling the inside of the storage space using cold air generated through heat exchange with a refrigerant circulating in a refrigeration cycle.

The refrigerator may be placed independently in a kitchen or a living room or may be accommodated in a kitchen cabinet.

The refrigerator is gradually becoming larger and more multi-functional in accordance with the change in dietary life and the trend of higher quality products. Refrigerators including various structures and convenience devices that take user convenience into consideration are being released.

As the prior art document, Korean Patent Registration No. 10-0596569 discloses a refrigerator.

The refrigerator of the prior art document includes a main body that forms a cooling compartment, a door that opens or closes the cooling compartment, and a water dispenser provided in the door.

The refrigerator includes a hinge portion connecting the door to the main body, a water supply pipe that supplies water from a water supply source to the water dispenser via the main body, the hinge portion, and the door, a hinge shaft body coupled to the hinge portion and made of a tubular body through which the water supply pipe passes, and a hinge shaft provided with a guide portion having an approximately elliptical cross-section such that the water supply pipe is introduced into the hinge shaft body at a gentle slope. The hinge shaft is provided at the hinge portion so as to be rotatable about the axis of the hinge shaft.

In the prior art document, since the water supply pipe and electric cables pass through the hinge portion and extend into the door, the diameter of the hinge portion has to be large. When the diameter of the hinge portion increases, there is a disadvantage in that the total thickness of the door increases.

On the other hand, in order to reduce the thickness of the door, the diameter of the hinge has to be reduced. However, there is a disadvantage in that the water pipe or electric cables cannot pass through the hinge portion.

DISCLOSURE OF INVENTION

Technical Problem

The present embodiment provides a refrigerator that allows at least one of a wire or a water pipe to be inserted into a door while reducing the thickness of the door.

Alternatively or additionally, there is provided a refrigerator in which a wire is branched from a water pipe within a door and is connectable to components within the door.

Alternatively or additionally, there is provided a refrigerator in which a printed circuit board (PCB) may be installed within a door while reducing the thickness of the door.

Technical Solution

A refrigerator according to one aspect may include: a cabinet including a storage space; a door configured to open or close the storage space, the door including an electric component; and a hinge device configured to rotatably connect the door to the cabinet.

The refrigerator may further include a water pipe withdrawn from the cabinet and inserted into the door.

The refrigerator may further include a wire configured to electrically connect a component in the door to the cabinet.

The door may include a door opening which is disposed at a position spaced apart from a rotation center by the hinge device and through which the water pipe and the wire pass.

The door may further include a guide disposed inside the door and aligned with the door opening. The water pipe and at least a portion of the wire having passed through the door opening may be located inside the guide.

The door may further include a dispenser configured to discharge at least one of water or ice.

The door opening may be located on an upper side of the door, and the guide may extend downward from the door opening so as to guide the water pipe toward the dispenser.

The guide may include a wire withdrawal portion through which the wire is withdrawn. The wire withdrawn from the wire withdrawal portion may be electrically connected to the electric component.

The door may include a printed circuit board (PCB) unit including a printed circuit board (PCB) and a plurality of elements installed on the PCB.

For example, the wire may include a first connection wire withdrawn through the wire withdrawal portion and connected to the PCB unit. The wire may further include a second connection wire connected to the PCB unit and connected to the electric component.

Alternatively, the wire may include: a first connection wire withdrawn through the wire withdrawal portion and connected to the PCB unit; and a third connection wire connected to the PCB unit, inserted into the guide through the wire withdrawal portion, and connected to the electric component.

The door may further include a frame, and a first side frame and a second side frame connected to the frame.

The frame may include a front wall and a rear wall spaced apart from the front wall. The PCB may be installed to be erected on the rear wall.

The rear wall may include a PCB mounting portion protruding in a direction away from the front wall. The PCB may be mounted on the PCB mounting portion.

The frame may include a recessed portion in which the hinge device is to be located. The door opening may be formed at a bottom of the recessed portion.

The frame may further include a connection wall connecting a lower side of the front wall to a lower side of the rear wall. A wire hole through which the wire passes may be formed in the connection wall.

The door opening may be located closer to the first side frame than the second side frame.

The wire withdrawal portion may extend from the guide toward the second side frame.

The door opening may be located closer to the first side frame than the second side frame.

At least a portion of the door opening may be disposed to overlap the dispenser in a vertical direction. A portion of the guide may be bent toward the first side frame.

The door may further include an ice-making compartment in which an ice maker configured to generate ice is located.

The wire withdrawal portion and the PCB unit may be located higher than a top surface of a wall forming the ice-making compartment.

The door may include an upper frame, a lower frame, and first and second side frames connected to the upper frame and the lower frame.

The door opening may be formed in the upper frame. The guide may extend from the upper frame side to the lower frame side. The PCB unit may be installed in the upper frame.

The door may include a dispenser configured to dispense at least one of water or ice, and first and second side frames.

The door opening may be located closer to the first side frame than the second side frame. At least a portion of the door opening may be disposed to overlap the dispenser in a vertical direction. A portion of the guide may be bent toward the first side frame.

Advantageous Effects

According to the present embodiment, since at least one of a wire or a water pipe may pass through a door opening located at a position spaced apart from a hinge center, there is an advantage in that at least one of the wire or the water pipe may be inserted into the door while reducing the thickness of the door.

According to the present embodiment, since a wire withdrawal portion is formed in a guide, a wire withdrawn within the guide may be connected to components inside the door.

According to the present embodiment, there is provided a refrigerator in which a printed circuit board (PCB) is installed to be erected in an upper frame of a door, such that the PCB may be installed within the door while reducing the thickness of the door.

BEST MODE FOR CARRYING OUT THE INVENTION

Figure 1:
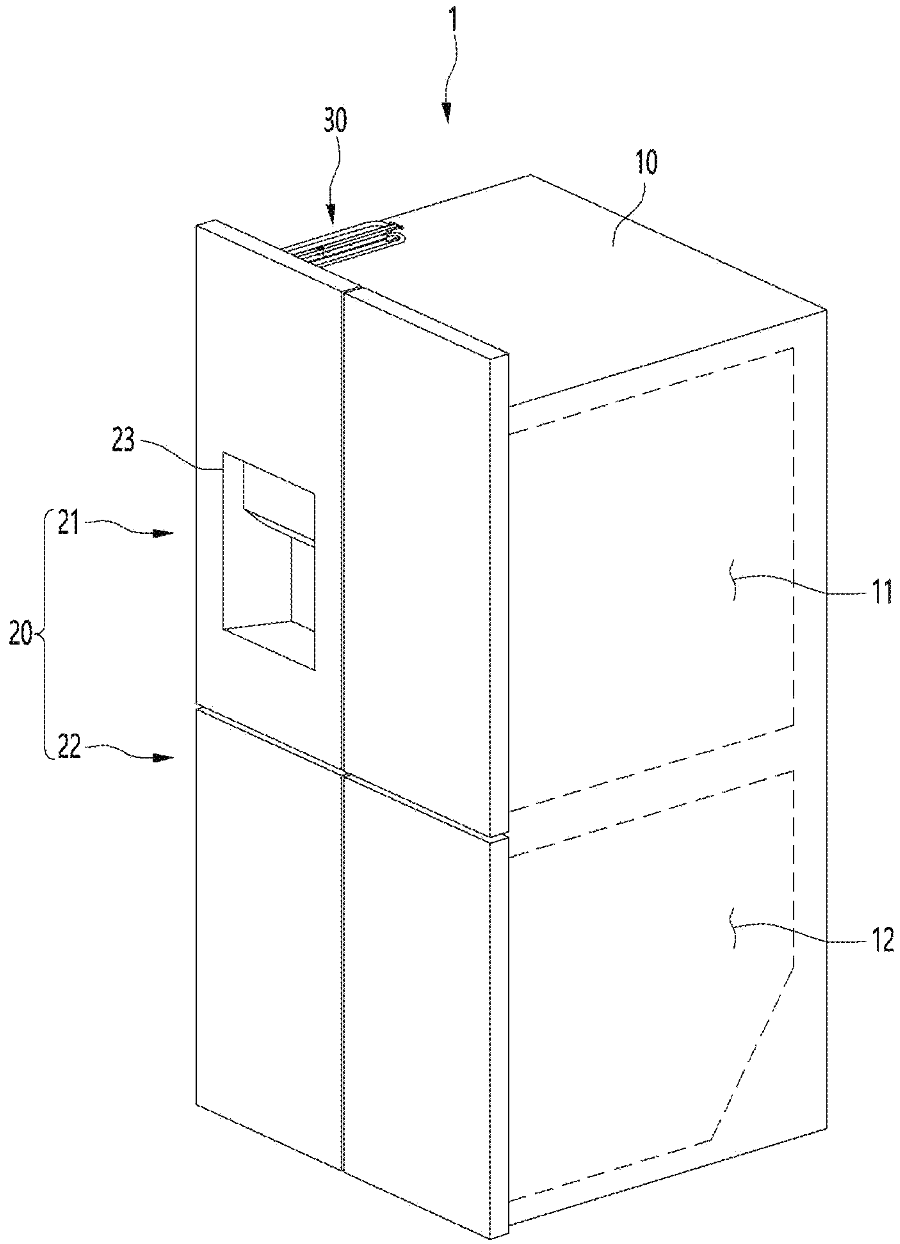
FIG. 1 is a perspective view of a refrigerator according to the present embodiment.

Hereinafter, some embodiments of the present invention will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. The terms are merely used to distinguish the corresponding component from other components, and do not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
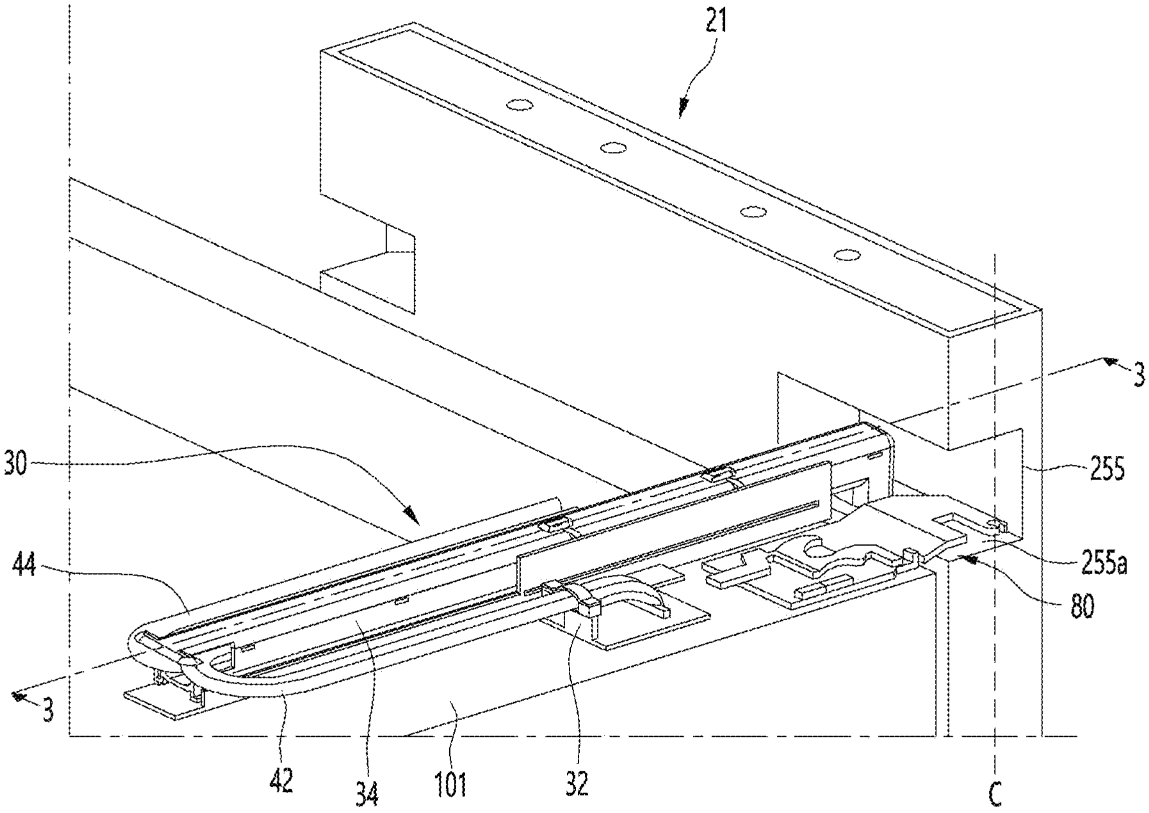
FIG. 2 is a perspective view showing a state in which a guide unit is connected to a cabinet and a door.
Figure 3:
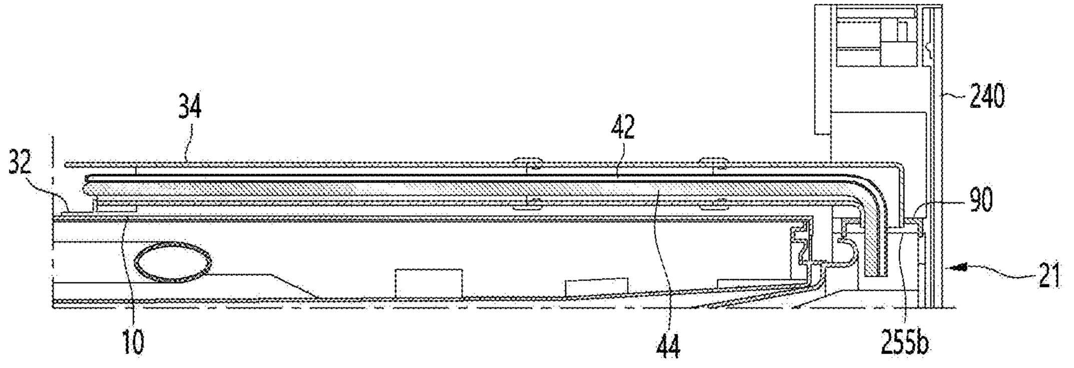
FIG. 3 is a cross-sectional view of a guide unit.
Figure 4:
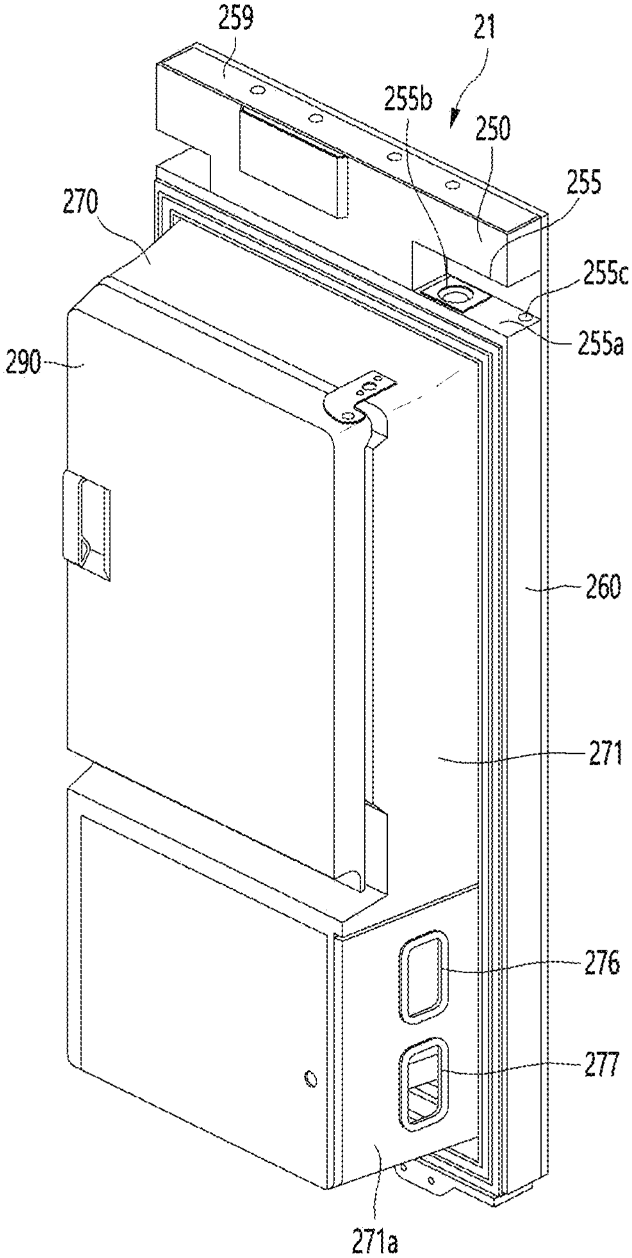
FIG. 4 is a perspective view of a first door of the present embodiment.

FIG. 1 is a perspective view of a refrigerator according to the present embodiment, FIG. 2 is a perspective view showing a state in which a guide unit is connected to a cabinet and a door, FIG. 3 is a cross-sectional view of a guide unit, and FIG. 4 is a perspective view of a first door of the present embodiment.

Referring to FIGS. 1 to 4, a refrigerator 1 according to the present embodiment may be independently installed in a kitchen or may be installed in an indoor furniture cabinet. When the refrigerator 1 is installed in an indoor furniture cabinet, the refrigerator 1 may be installed alone or may be disposed together with other refrigerators side-by-side.

The refrigerator 1 may include a cabinet 10 including a storage space, and a refrigerator door 20 that opens or closes the storage space.

The storage space is not limited, but may be divided into a first space 11 on an upper side and a second space 12 on a lower side. The refrigerator door 20 may include a first door 21 that opens or closes the first space 11 and a second door 22 that opens or closes the second space 12.

The first space 11 may be a refrigerating compartment and the second space 12 may be a freezing compartment, or vice versa. Alternatively, the storage space may include a first space and a second space divided into left and right sides. Alternatively, the storage space may be a single space, and a single refrigerator door may open or close the storage space.

At least one of the first door 21 or the second door 22 may be a rotary type door. Alternatively, the single refrigerator door 20 may be a rotary type door.

In the present embodiment, a case where two first doors 21 are disposed left and right is described as an example.

The first door 21 may be rotatably connected to the cabinet 10 by a hinge device 80. The hinge device 80 may include a hinge pin that provides a rotation center C of the first door 21.

At least one of the two first doors 21 may include a dispenser 23. The dispenser 23 may discharge water and/or ice. FIG. 1 shows an example in which the dispenser is provided in the first door 21 of the left side.

Although not shown, the first door 21 may be provided with a component that operates to discharge water and/or ice. The component may be electrically connected to a wire 44. Alternatively, separately from the component, the first door 21 may include a display unit and/or an input unit, and the display unit and/or the input unit may be electrically connected to the wire 44.

For example, the wire 44 may be connected to a controller provided in the cabinet 10, may be inserted into the first door 21, and may be directly or indirectly connected to the component (when connected to a separate wire provided in the first door).

In order for the dispenser 23 to discharge water, the dispenser 23 may be connected to a water pipe 42. The water pipe 42 may be withdrawn from the inside to the outside of the cabinet 10 and then inserted into the first door 21 through the first door 21.

In the present specification, it is noted that the expression "the wire 44 and/or the water pipe 42 are/is introduced into the first door 21 or the cabinet 10" means that the wire 44 and/or the water pipe 42 are/is withdrawn from the first door 21 or the cabinet 10.

The water pipe 42 may be inserted into the first door 21 and directly or indirectly connected to the dispenser 23 (when connected to a separate additional water pipe provided in the first door).

In the present embodiment, at least one of the water pipe 42 or the wire 44 may be inserted into the first door 21.

FIG. 2 shows an example in which the water pipe 42 and the wire 44 are inserted into the first door 21.

When installing the refrigerator 1 in a furniture cabinet of a kitchen, the refrigerator door 20 may generally protrude in front of the furniture cabinet, although the refrigerator door 200 may vary depending on the size of the furniture cabinet. In order to prevent the refrigerator door 20 from protruding in front of the furniture cabinet, it may be considered to reduce the thickness of the refrigerator door 20.

In the case of the general refrigerator 1, the refrigerator door 20 is thick. Accordingly, the diameter of the hinge pin of the hinge device 80 may be increased. In this case, the water pipe 42 and the wire 44 may pass through the hinge pin.

However, when reducing the thickness of the refrigerator door 20, the diameter of the hinge pin has to be reduced. When the diameter of the hinge pin is reduced, the water pipe 42 and the wire 44 cannot pass through the hinge pin.

Accordingly, in the present embodiment, the water pipe 42 and the wire 44 may pass through the refrigerator door 20 at a position spaced apart from the hinge device and may be inserted into the refrigerator door 20.

In the case of the present embodiment, the water pipe 42 and the wire 44 may pass through the first door 21 on one side of the hinge device 80.

The present embodiment may further include a guide unit 30 for guiding the water pipe 42 and the wire 44. The guide unit 30 may be omitted.

The guide unit 30 may protect the water pipe 42 and/or the wire 44 and may minimize exposure of the water pipe 42 and/or the wire 44 to the outside during the process of opening the first door 21.

The guide unit 30 may include a guide housing 34 that accommodates the water pipe 42 and/or the wire 44. The guide unit 30 may further include a cabinet guide 32 that is fixed to an upper wall 101 of the cabinet 10 to guide the movement of the guide housing 34.

The cabinet guide 32 may be coupled to a position adjacent to the hinge device 80 in the cabinet 10.

The water pipe 42 may be withdrawn from the cabinet 10 directly behind the hinge device 80 and accommodated in the guide housing 34.

The water pipe 42 that is withdrawn from the cabinet 10 may extend rearward and may be then inserted into the guide housing 34 from the rear side of the guide housing 34, but the present disclosure is not limited thereto.

The wire 44 may be located on the opposite side of the water pipe 42 with respect to the guide housing 34 and may be inserted into the guide housing 34 from the rear side of the guide housing 34, but the present disclosure is limited thereto.

When the first door 21 is in a closed state, the guide housing 34 may extend in a straight-line shape. Referring to FIG. 2, the guide housing 34 may extend in a straight-line shape in a front-and-back direction.

Accordingly, the water pipe 42 and the wire 44 may also be guided toward the first door 21 in a straight-line shape within the guide housing 34.

The top surface of the first door 21 may be located higher than the upper wall 101 of the cabinet 10. The first door 21 may include a recessed portion 255 such that the guide housing 34, which is movable along the cabinet guide 32 installed on the upper wall of the cabinet 10, is connected to the first door 21.

The recessed portion 255 may be formed as the rear surface of the first door 21 is recessed forward. The recessed portion 255 may be disposed at a position spaced downward from the top surface of the first door 21.

Substantially, a bottom 255*a* of the recessed portion 255 may be located at a height equal to or substantially similar to a height of the top surface of the cabinet 10.

As another example, the recessed portion 255 may also be recessed downward from the top surface of the first door 21. Alternatively, the recessed portion 255 may also be recessed horizontally on one side surface of the first door 21.

A portion of the hinge device 80 may be inserted into the recessed portion 255 and connected to the bottom 255*a*.

A portion of the guide housing 34 extending in a straight-line shape when the first door 21 is in a closed state may be inserted into the recessed portion 255 and may be connected to the bottom 255*a* by a door fixing portion 90.

In the present embodiment, since the water pipe 42 and the wire 44 are guided up to the recessed portion 255 of the first door 21 in a straight-line shape within the guide housing 34, the bending of the water pipe 42 and the wire 44 within the guide housing 34 may be minimized.

A door opening 255*b* may be formed in the bottom 255*a* of the recessed portion 255.

A hinge hole 255*c* through which the hinge pin passes may be formed in the bottom 255*a* of the recessed portion 255.

The rotation center C may pass through the hinge hole 255*c* in a vertical direction.

The water pipe 42 and the wire 44, which are guided to the recessed portion 255, may pass through the door opening 255*b* and may be then inserted into the first door 21. Alternatively, the water pipe 42 and the wire 44, which pass through the door opening 255*b* and are withdrawn from the inside of the first door 21, may be guided toward the cabinet 10 by the guide housing 34.

The diameter of the door opening 255*b* may be greater than the diameter of the hinge hole 255*c*.

The door opening 255*b* is spaced apart from the hinge hole 255*c*.

With respect to the first side surface adjacent to the hinge hole 255*c* among two side surfaces of the first door 21, the distance between the first side surface and the hinge hole 255*c* may be greater than the distance between the first side surface and the door opening 255*b*.

The diameter of the door opening 255*b* may be greater than the distance from the front surface of the first door 21 to the door opening 255*b*.

Hereinafter, the structure of the first door is described in more detail.

Referring to FIGS. 3 and 4, the first door 21 of the present embodiment may include a door frame. The door frame may form a portion of the outer shape of the first door 21. For example, the door frame may form at least a circumference of the first door 21.

The first door 21 may further include a door liner 270 coupled to the rear surface of the door frame.

The first door 21 may further include a front panel 240 coupled to the front surface of the door frame.

For example, the door frame may include all or some of an upper frame 250, a lower frame 268, and side frames 260 and 262 (see FIG. 5) connecting the upper frame 250 to the lower frame 268.

The door frame may be formed to have a rectangular frame shape including an opening by the upper frame 250, the lower frame 268, and the side frames 260 and 262 (see FIG. 5) connecting the upper frame 250 to the lower frame 268.

Although not shown, the door frame may further include a front frame. The front frame may cover the opening of the door frame in front of the door frame.

The front panel 240 may be located on the front surface of the front frame in the door frame. The front panel 240 is not limited, but may be coupled to the upper frame 250 and the lower frame 228.

The front panel 240 may include a panel opening for exposing the dispenser 23, and the front frame may also include a frame opening corresponding to the panel opening.

The door liner 270 may form an ice-making compartment that accommodates an ice maker that generates ice. The ice-making compartment of the door liner 270 may be covered by an ice-making compartment door 290.

The door liner 270 may include a first liner 271 forming the ice-making compartment and a second liner 271*a* located below the first liner 271.

When the first door 21 is viewed from the side, the left-and-right width of the second liner 271*a* may be greater than the left-and-right width of the first liner 271.

The second liner 271*a* may form a space in which a filter that purifies water discharged from the dispenser 23 and/or a water tank that stores water purified in the filter are located.

The second liner 271*a* may include a first cold air opening 276 and a second cold air opening 277. Cold air to be supplied to the ice-making compartment may be introduced into the first cold air opening 276. The cold air supplied to the ice-making compartment may be discharged from the first door 21 through the second cold air opening 277. Although not shown, a first cold air duct that communicates the first cold air opening 276 with the ice-making compartment and a second cold air duct that communicates the ice-making compartment with the second cold air opening 277 may be provided in the first door 21.

Figure 5:
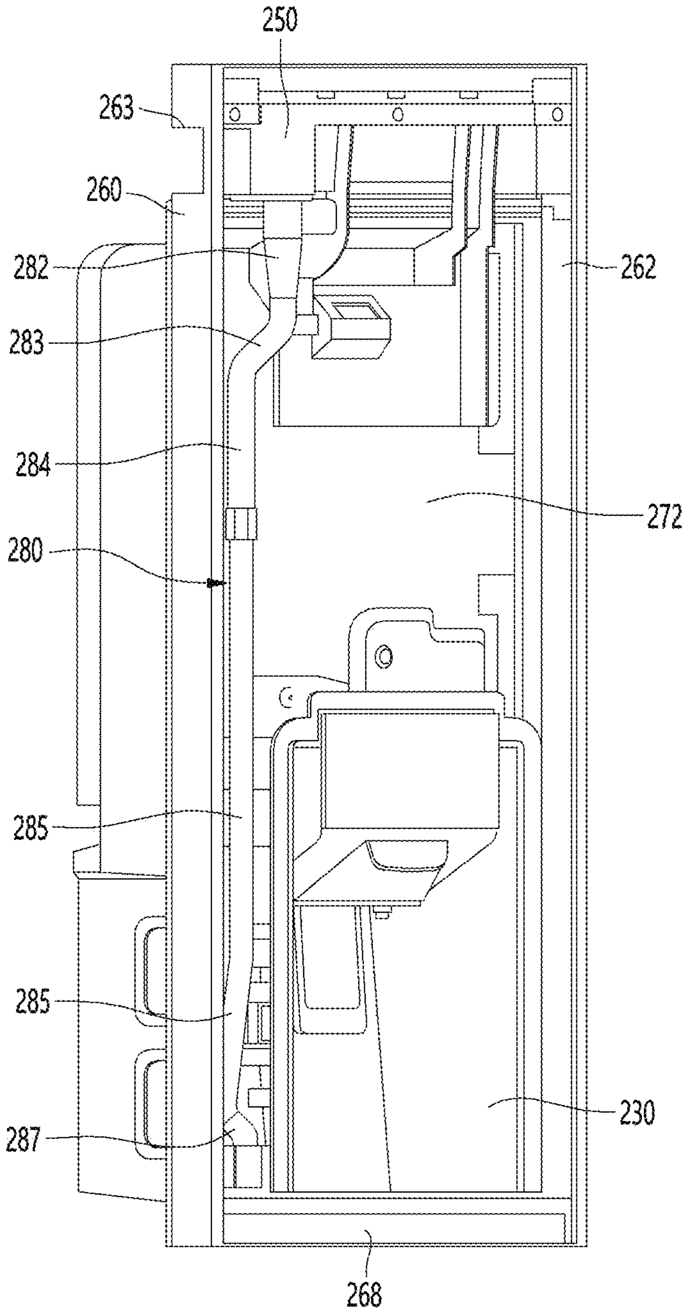
FIG. 5 is a view showing the internal configuration of the first door of the present embodiment.
Figure 6:
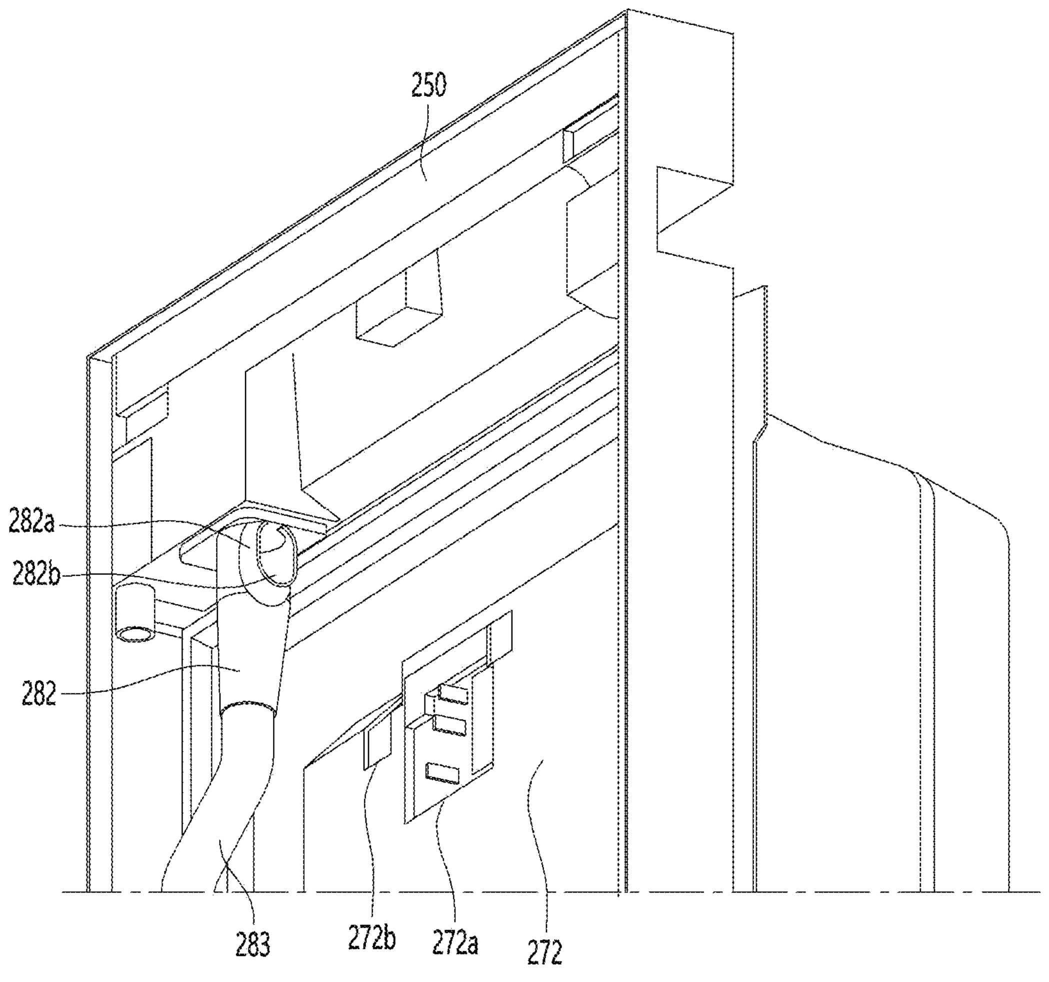
FIG. 6 is a view showing a portion a guide inside the first door of the present embodiment.

FIG. 5 is a view showing the internal configuration of the first door of the present embodiment, and FIG. 6 is a view showing a portion a guide inside the first door of the present embodiment.

Referring to FIGS. 3 to 6, the side frames 260 and 262 may include a first side frame 260 and a second side frame 262. The first side frame 260 may be in contact with one side surface of the upper frame 250 and one side surface of the lower frame 268.

The second side frame 262 may be in contact with the other side surface of the upper frame 250 and the other side surface of the lower frame 268.

The first side frame 260 is located adjacent to the recessed portion 255. The first side frame 260 may include an opening 263 formed at a position corresponding to the recessed portion 255. The opening 263 allows the first door 21 to rotate without interference with the hinge device 80.

The first door 21 may further include a guide 280 that guides the water pipe 42 within the first door 21. The first door 21 may further include a dispenser housing 230.

The guide 280 may extend from the door opening 255*b* to the dispenser housing 230. For example, the guide 280 may extend from the upper frame 250 to the lower frame 268.

The guide 280 may be formed in a tube shape having a passage therein and may be bent once or more times.

A foaming liquid for forming an insulation material may be injected into the first door 21. The water pipe 42 may be accommodated in the guide 280. Accordingly, the water pipe 42 may be prevented from contacting the foaming liquid.

The upper side of the guide 280 may be fixed to the bottom 255*a* of the recessed portion 255 of the upper frame 250. The guide 280 may be aligned with the door opening 255*b* in a state of being fixed to the bottom surface of the bottom 255*a*.

Accordingly, the water pipe 42 having passed through the door opening 255*b* may be inserted into the guide 280.

The guide 280 may include a first part 282 aligned with the door opening 255*b*. The first part 282 may extend in the vertical direction.

At least a portion of the door opening 255*b* may overlap the dispenser housing 230 in the vertical direction. When the guide 280 extends downward in a straight-line shape, the guide 280 may interfere with the dispenser housing 230.

Accordingly, the guide 280 may further include a second part 283 that is inclined from the first part 282.

The second part 283 may be extended to be inclined downward from the first part 282 toward the first side frame 260.

The guide 280 may further include a third part 284 extending downward from the second part 283.

The third part 284 may extend into the space between the dispenser housing 230 and the first side frame 260.

Alternatively, the fourth part 285 may be connected to the third part 284, and the fourth part 285 may extend into the space between the dispenser housing 230 and the first side frame 260.

The guide 280 may further include a fifth part 286 extending rearward from the fourth part 285. The guide 280 may further include a sixth part 287 extending obliquely with the fifth part 286.

It is noted that, in the present embodiment, the shape of the guide 280 is not limited, the guide 280 may have various shapes, and there is no limitation on the number of distinguishable parts.

In the present embodiment, since the wire 44 passes through the opening 255*b*, the wire 44 may also be accommodated in the guide 280.

That is, the guide 280 may accommodate and guide the water pipe 42 and the wire 44 together.

Since the wire 44 inside the guide 280 has to be connected to a component outside the guide 280, the guide 280 further includes a wire withdrawal portion 282*a* through which the wire 44 passes.

The wire withdrawal portion 282*a* may include a wire opening 282*b*. The wire withdrawal portion 282 may protrude in a direction away from the guide 280. At this time, the size of the wire withdrawal portion 282 may decrease as the distance from the guide 280 increases.

Substantially, a plurality of wires 44 may be located inside the guide 280. Depending on the location of the component for connection to the wire 44, some of the plurality of wires 44 may be withdrawn toward the wire withdrawal portion 282, and others thereof may extend toward the dispenser housing 230 along the guide 280.

As an example, the component for connection to the wire 44 may be located in the upper frame 250 and the ice-making compartment. Hereinafter, the structure for connecting the wire 44 is described.

Since the ice-making compartment and the upper frame 250 are located on the upper side of the first door 21, it is preferable that the wire withdrawal portion 282*a* is located adjacent to the upper side of the upper frame 250 or the ice-making compartment such that the length of the wire 44 is reduced.

For example, the wire withdrawal portion 282*a* may be formed in the first part 282. The wire withdrawal portion 282*a* may extend from the first part 282 so as to be close to the second side frame 262.

The door liner 270 may include a wall 272 forming the ice-making compartment, and the wall 272 may include connecting openings 272*a* and 272*b*. The wire 44 may pass through the connecting openings 272*a* and 272*b*. FIG. 6 shows two connecting openings 272*a* and 272*b* as an example, but there is no limitation to the number of connecting openings 272*a* and 272*b*. A single connecting opening may be formed or three or more connecting openings may be formed.

The wire withdrawal portion 282*a* may be located higher than the connecting openings 272*a* and 272*b*. The wire withdrawal portion 282*a* may be located higher than the top surface of the wall 272.

Figure 7:
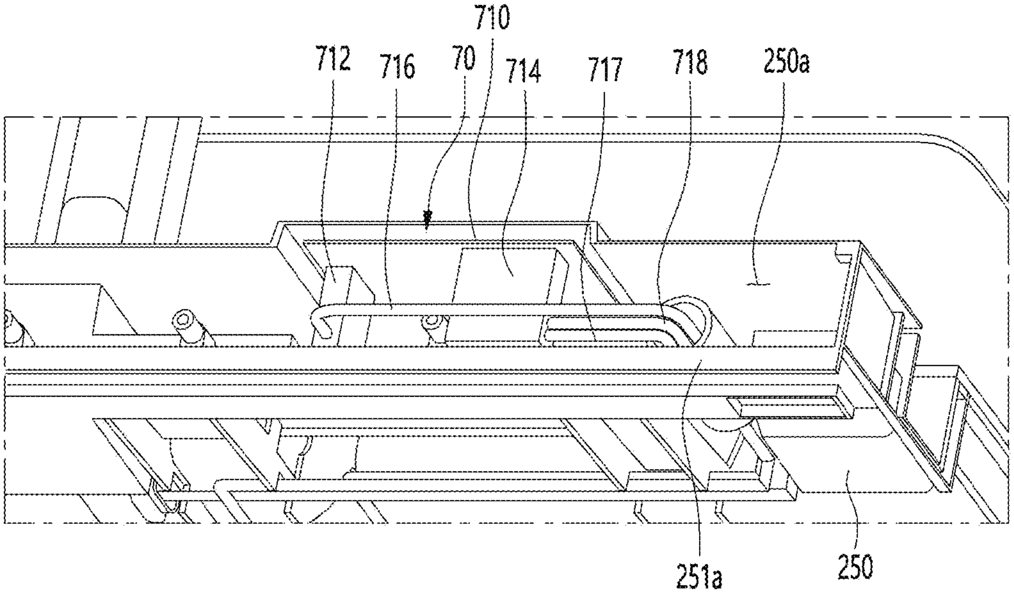
FIG. 7 is a view showing a state in which a printed circuit board (PCB) unit is installed on an upper frame of the present embodiment.
Figure 8:
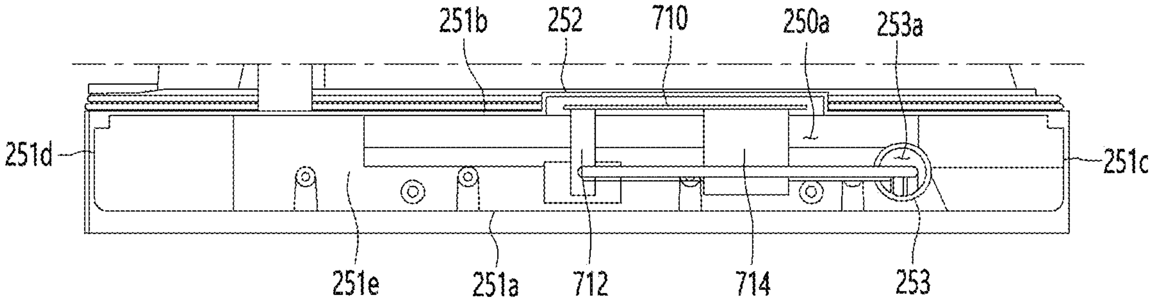
FIG. 8 is a plan view of the upper frame of the present embodiment.
Figure 9:
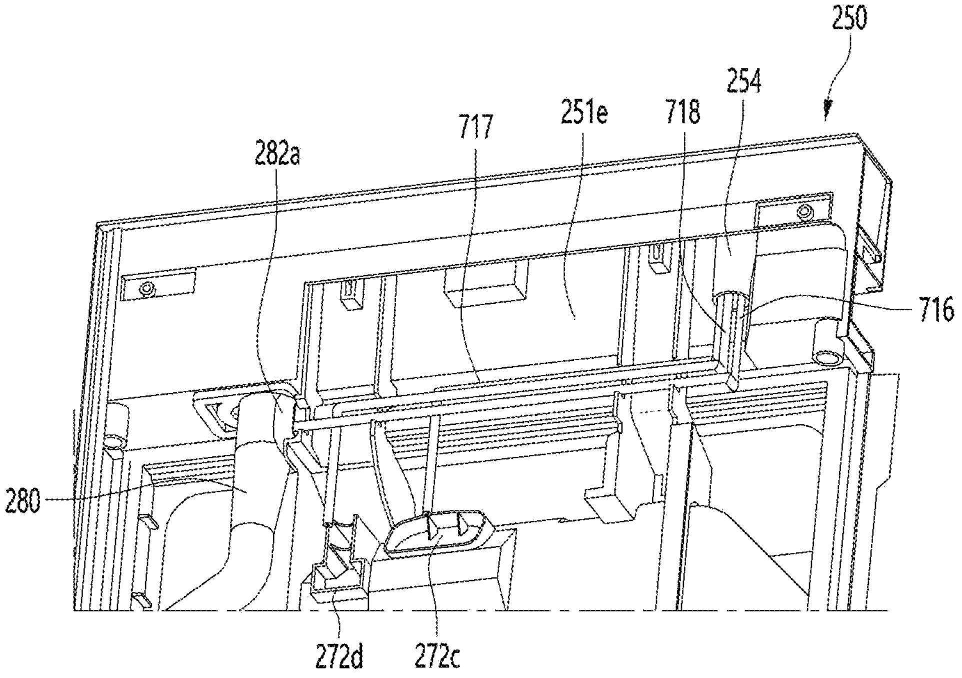
FIG. 9 is a view showing the arrangement of wires inside the first door of the present embodiment.

FIG. 7 is a view showing a state in which a printed circuit board (PCB) unit is installed on an upper frame of the present embodiment, FIG. 8 is a plan view of the upper frame of the present embodiment, and FIG. 9 is a view showing the arrangement of wires inside the first door of the present embodiment.

Referring to FIGS. 7 to 9, the upper frame 250 may form a space 251*b* in which a PCB unit 70 is accommodated.

The PCB unit 70 may receive power from the cabinet 10 and may control one or more components among a plurality of components provided in the first door 21 or supply power to the one or more components.

It is noted that the wire mentioned in the present specification is a general term for a wire for transmitting power and a wire for transmitting a signal.

Hereinafter, a case where the PCB unit 70 is provided in the ice-making compartment or connected to components for operating the ice maker is described as an example. The components may include one or more of sensors, heaters, motors, valves, etc.

The upper frame 250 may include a front wall 251*a*, a rear wall 251*b*, and a plurality of side walls 251*c* and 251*d* connecting the front wall 251*a* to the rear wall 251*b*.

The upper frame 250 may include a connection wall 251*e* connecting the lower side of the front wall 251*a* to the lower side of the rear wall 251*b*.

The front wall 251*a* is a wall facing the front panel, and the rear wall 251*b* is a wall spaced apart from the rear side of the front wall 251*a*.

The PCB unit 70 may be installed on one side wall of the upper frame 250.

The PCB unit 70 may include a printed circuit board (PCB) 710 and a plurality of elements 712 and 714 installed on the PCB 710.

The PCB 710 may be formed in a plate shape with a predetermined thickness and size. The size of the PCB 710 may be defined by a length in a first direction and a length in a second direction.

In the present embodiment, the length of the PCB 710 in the first direction and the length of the PCB 710 in the second direction may be greater than the length between the front wall 251*a* and the rear wall 251*b* in the upper frame 250.

It is difficult to install the PCB 710 on the plurality of side walls 251*c* and 251*d* or to install the PCB 710 on the upper frame 250 while the PCB 710 is in a horizontal state.

Accordingly, the PCB 710 may be installed in a state of being erected on the front wall 251*a* or the rear wall 251*b*.

FIG. 7 shows a state in which the PCB 710 is installed on the rear wall 251*b*.

The protruding length of at least one of the plurality of elements 712 and 714 installed on the PCB 710 may be greater than the distance between the front wall 251*a* and the rear wall 251*b*.

Therefore, when the PCB 710 is installed on the rear wall 251*b*, the rear wall 251*b* may include a PCB mounting portion 252 protruding in a direction away from the front wall 251*a* so as to prevent interference between the front wall 251*a* and at least one of the plurality of elements 712 and 714 coupled to the PCB 710. When the PCB 710 is mounted in the space formed by the PCB mounting portion 252, the plurality of elements 712 and 714 may be prevented from contacting the front wall 251*a*.

The PCB 710 may be coupled to the PCB mounting portion 252 by a coupling member such as a hook, a bolt, an adhesive, a rib, or the like. In the present specification, it is noted that the structure for coupling the PCB 710 to the PCB mounting portion 252 is not limited.

The wire 44 may include a first connection wire 716 connected to the PCB unit 70. The wire 44 may further include second connection wires 717 and 718 connected to the PCB unit 70 and the components of the first door 21.

The first connection wire 716 may be a wire that extends from the cabinet 10 and is withdrawn from the wire withdrawal portion 282*a* of the guide 280.

A wire hole 253*a* through which the wires 716, 717, and 718 pass may be formed in the connection wall 251*e*.

The connection wall 251*e* may be provided with an inner guide 253 that guides the wire having passed through the wire hole 253*a* to the inside of the upper frame 250. The inner guide 253 may extend upward from the connection wall 251*e*.

The connection wall 251*e* may be provided with an outer guide 254 that guides the wire having passed through the wire hole 253*a* to the outside of the upper frame 250.

FIG. 9 shows one first connection wire 716 and two second connection wires 717 and 718 as an example, but it is noted that there is no limitation to the number of connection wires according to the number of components.

The first connection wire 716 may be connected to the PCB 710 or one of the plurality of elements 712 and 714. FIG. 8 shows that the first connection wire 716 is connected to the first element 712 among the plurality of elements 712 and 714 as an example, but the present disclosure is not limited thereto.

The second connection wires 717 and 718 may be connected to the PCB 710 or the other of the plurality of elements 712 and 714. FIG. 8 shows that the first connection wire 716 is connected to the second element 714 among the plurality of elements 712 and 714 as an example, but the present disclosure is not limited thereto. In addition, FIG. 8 shows two second connection wires 717 and 718 as an example, but the present disclosure is not limited thereto.

The wall 272 forming the ice-making compartment may include extension portions 272*c* and 272*d* extending from the connecting openings 272*a* and 272*b*.

The second connection wires 717 and 718 connected to the PCB unit 70 and having passed through the wire hole 253*a* may pass through the connecting openings 272*a* and 272*b*.

The extension portions 272*c* and 272*d* may be disposed around the second connection wires 717 and 718 passing through the connecting openings 272*a* and 272*b*, thereby protecting the second connection wires 717 and 718. In addition, the extension portions 272*c* and 272*d* may serve to limit the flow of the foaming liquid toward the connecting openings 272*a* and 272*b*.

Some of the plurality of second connection wires 717 and 718 may pass through the first connecting opening 272*a*, and others of the plurality of second connection wires 717 and 718 may pass through the second connecting opening 272*b*.

One second connection wire may pass through one connecting opening, the plurality of second connection wires may respectively pass through the plurality of connecting openings, or the plurality of second connection wires may pass through one connecting opening.

Meanwhile, although not shown, the wire 44 may optionally further include a third connection wire.

The third connection wire may be additionally connected to the PCB unit 70. The third connection wire may be connected to one component of the dispenser 23. In this case, the third connection wire connected to the PCB unit 70 may pass through the wire hole 253*a* and may be then inserted into the guide 280 through the wire withdrawal portion 282*a*. The third connection wire inside the guide 280 may extend toward the dispenser 23 along the guide 280.

The wire 44 may optionally include a fourth connection wire. The fourth connection wire may be a wire that extends from the cabinet 10 directly to the dispenser 23 through the door opening and the guide.

The invention claimed is:

1. A refrigerator, comprising:
- a cabinet comprising a storage space;
- a door configured to open or close the storage space, the door comprising an electric component;
- a hinge device configured to rotatably connect the door to the cabinet;
- a water pipe that extends from the cabinet into the door; and
- a wire configured to electrically connect a component in the door to the cabinet, wherein the door comprises:
  - a door opening which is located at an upper side of the door and disposed at a position spaced apart from a rotation center of the hinge device and through which the water pipe and the wire pass; and
  - a guide disposed inside of the door and aligned with the door opening, wherein the guide comprises a wire withdrawal portion at an upper portion thereof adjacent the door opening through which the wire extends, and wherein the wire that extends through the wire withdrawal portion is electrically connected to the electric component.

2. The refrigerator of claim 1, wherein the water pipe and at least a portion of the wire having passed through the door opening are located inside the guide and extend downward therein.

3. The refrigerator of claim 1, wherein the door further comprises a dispenser configured to discharge at least one of water or ice, and wherein the guide extends downward from the door opening so as to guide the water pipe toward the dispenser.

4. The refrigerator of claim 1, wherein the door comprises a printed circuit board (PCB) unit including a printed circuit board (PCB) and a plurality of elements installed on the PCB, and wherein the wire comprises:
- a first connection wire that extends through the wire withdrawal portion and is connected to the PCB unit; and
- a second connection wire connected to the PCB unit and connected to the electric component.

5. The refrigerator of claim 1, wherein the door comprises a printed circuit board (PCB) unit including a printed circuit board (PCB) and a plurality of elements installed on the PCB, and wherein the wire comprises:
- a first connection wire that extends through the wire withdrawal portion and is connected to the PCB unit; and
- a third connection wire connected to the PCB unit, inserted into the guide through the wire withdrawal portion, and connected to the electric component.

6. The refrigerator of claim 1, wherein the door comprises:
- a printed circuit board (PCB) unit including a printed circuit board (PCB) and a plurality of elements installed on the PCB; and
- a frame on which the PCB unit is mounted, and wherein the door opening is formed in the frame.

7. The refrigerator of claim 6, wherein the frame comprises a front wall and a rear wall spaced apart from the front wall, and wherein the PCB is installed on the rear wall.

8. The refrigerator of claim 7, wherein the rear wall comprises a PCB mounting portion protruding in a direction away from the front wall, and wherein the PCB is mounted on the PCB mounting portion.

9. The refrigerator of claim 7, wherein the frame comprises a recessed portion in which the hinge device is installed, and wherein the door opening is formed at a bottom of the recessed portion.

10. The refrigerator of claim 7, wherein the frame further comprises a connection wall connecting a lower side of the front wall to a lower side of the rear wall, and wherein a wire hole through which the wire passes is formed in the connection wall.

11. The refrigerator of claim 1, wherein the door comprises a frame and first and second side frames connected to the frame, and wherein the door opening is located closer to the first side frame than the second side frame.

12. The refrigerator of claim 11, wherein the wire withdrawal portion extends from the guide toward the second side frame.

13. The refrigerator of claim 1, wherein the door comprises:
- an ice-making compartment in which an ice maker that generates ice is located, wherein a printed circuit board (PCB) unit is connected to the wire, and wherein the wire withdrawal portion and the PCB unit are located higher than a top surface of a wall forming the ice-making compartment.

14. The refrigerator of claim 13, wherein the door comprises an upper frame, a lower frame, and first and second side frames connected to the upper frame and the lower frame, wherein the door opening is formed in the upper frame, and the guide extends from the upper frame side to the lower frame side, and wherein the PCB unit to which the wire is connected is installed in on the upper frame.

15. The refrigerator of claim 1, wherein the door comprises a dispenser configured to dispense at least one of water or ice, and first and second side frames, wherein the door opening is located closer to the first side frame than the second side frame, wherein at least a portion of the door opening is disposed to overlap the dispenser in a vertical direction, and wherein a portion of the guide is bent toward the first side frame.

16. A refrigerator, comprising:

a cabinet comprising a storage space;

a door configured to open or close the storage space, the door comprising an electric component;

a hinge device configured to rotatably connect the door to the cabinet;

a water pipe that extends from the cabinet into the door; and a wire configured to electrically connect a component in the door to the cabinet, wherein the door comprises:

a door opening which is disposed at a position spaced apart from a rotation center of the hinge device and through which the water pipe and the wire pass; and a guide disposed inside of the door and aligned with the door opening, wherein the guide comprises a wire withdrawal portion through which the wire extends, wherein the wire that extends through the wire withdrawal portion is electrically connected to the electric component, wherein the door comprises a printed circuit board (PCB) unit including a printed circuit board (PCB) and a plurality of elements installed on the PCB, and wherein the wire comprises:

a first connection wire that extends through the wire withdrawal portion and is connected to the PCB unit; and a third connection wire connected to the PCB unit, inserted into the guide through the wire withdrawal portion, and connected to the electric component.

17. A refrigerator, comprising:

a cabinet comprising a storage space;

a door configured to open or close the storage space, the door comprising an electric component;

a hinge device configured to rotatably connect the door to the cabinet;

a water pipe that extends from the cabinet into the door; and a wire configured to electrically connect a component in the door to the cabinet, wherein the door comprises:

a door opening which is disposed at a position spaced apart from a rotation center of the hinge device and through which the water pipe and the wire pass; and a guide disposed inside of the door and aligned with the door opening, wherein the guide comprises a wire withdrawal portion through which the wire extends, wherein the wire that extends through the wire withdrawal portion is electrically connected to the electric component, wherein the door comprises:

an ice-making compartment in which an ice maker that generates ice is located, wherein a printed circuit board (PCB) unit is connected to the wire, and wherein the wire withdrawal portion and the PCB unit are located higher than a top surface of a wall forming the ice-making compartment.

18. The refrigerator of claim 17, wherein the door comprises an upper frame, a lower frame, and first and second side frames connected to the upper frame and the lower frame, wherein the door opening is formed in the upper frame, and the guide extends from the upper frame side to the lower frame side, and wherein the PCB unit to which the wire is connected is installed in the upper frame.

* * * * *